US012511326B2

(12) United States Patent
Pérez et al.

(10) Patent No.: US 12,511,326 B2
(45) Date of Patent: Dec. 30, 2025

(54) KEYWORD FILTERING FOR DIGITAL CONTENT RECOMMENDATION

(71) Applicant: Google LLC, Mountain View, CA (US)

(72) Inventors: François Pérez, Paris (FR); Pierre Dulac, Vanves (FR); Mariam Youssef, Dubai (AE); Mehdi Bouazza, Verneuil sur Seine (FR)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/584,681

(22) Filed: Feb. 22, 2024

(65) Prior Publication Data

US 2025/0272332 A1    Aug. 28, 2025

(51) Int. Cl.
G06F 16/435    (2019.01)
G06F 16/438    (2019.01)
G06F 16/48     (2019.01)

(52) U.S. Cl.
CPC .......... *G06F 16/435* (2019.01); *G06F 16/438* (2019.01); *G06F 16/48* (2019.01)

(58) Field of Classification Search
CPC ....... G06F 16/435; G06F 16/438; G06F 16/48
USPC ......................................................... 707/722
See application file for complete search history.

(56) References Cited

U.S. PATENT DOCUMENTS

| 8,554,618 B1 | 10/2013 | Gasch | |
| 2007/0100803 A1 | 5/2007 | Cava | |
| 2010/0223125 A1 | 9/2010 | Spitkovsky | |
| 2011/0264507 A1 | 10/2011 | Zhou et al. | |
| 2012/0158765 A1* | 6/2012 | Kumar | G06F 16/3325 707/766 |
| 2013/0124504 A1* | 5/2013 | Haugen | G06F 16/951 707/E17.014 |
| 2018/0039691 A1* | 2/2018 | Hazra | G06Q 10/10 |
| 2018/0089191 A1* | 3/2018 | Obasanjo | G06F 16/334 |
| 2018/0218079 A1* | 8/2018 | Li | G06F 16/9535 |
| 2020/0364463 A1* | 11/2020 | Pooja | G06V 20/47 |

(Continued)

OTHER PUBLICATIONS

D. Loris: Identification of Negative Keywords in Search Marketing with Embedding Layers and Neural Networks, Universitate de Barcelona, Fundamental Principles of Data Science Master's Thesis, Jan. 18, 2021, 39 pp.

(Continued)

*Primary Examiner* — Cam Y T Truong
(74) *Attorney, Agent, or Firm* — Lerner David LLP

(57) ABSTRACT

Methods, systems, and apparatus, including computer-readable storage media, for keyword list filtering as part of identifying digital content responsive or relevant to a search query or request for content. A user, such as a content provider, may generate a keyword list associated with digital content of the content provider. Keyword lists, however, may be built over the course of years and can grow to include millions of keywords. Further, these keyword lists are often not maintained in line with changes in a content provider's digital content delivery strategy or context. An artificial intelligence (AI) model may be trained to generate a summary of the digital content associated with the content provider. That summary, along with the keyword list of the content provider, is provided as input into the AI model, which is trained to provide, as output, a recommendation to keep or remove a keyword from the keyword list.

20 Claims, 14 Drawing Sheets

(56) References Cited

U.S. PATENT DOCUMENTS

| | | | |
|---|---|---|---|
| 2021/0109960 A1* | 4/2021 | Park | G06F 40/295 |
| 2021/0149955 A1* | 5/2021 | Cannon | H04N 21/8456 |
| 2021/0349949 A1* | 11/2021 | Agarwal | G06F 16/9035 |
| 2021/0383127 A1* | 12/2021 | Kikin-Gil | G06V 10/811 |
| 2022/0027395 A1* | 1/2022 | Rehling | G06F 40/30 |
| 2022/0414168 A1* | 12/2022 | Gomes Pereira | G06F 16/9035 |
| 2023/0229288 A1* | 7/2023 | Sicora | G06F 3/0482 715/764 |
| 2023/0377583 A1 | 11/2023 | Edara | |

OTHER PUBLICATIONS

R. Kaliyur: Keyword Matching—Types and How it works on Google Ads, Copyright 2023 Factors.AI, Published Jul. 14, 2022, Updated: Jul. 22, 2023, 10 pp.

A. Bulut: Lean Marketing: Know who not to advertise to!, Electronic Commerce Research and Applications, Science Direct, vol. 14, Issue 6, Oct.-Nov. 2015, pp. 631-640.

M. Kraan: Negative Keyword List Cleaner, Copyright 2019-2024 Adsscripts.com, 9 pp.

* cited by examiner

KEYWORD FILTERING FOR DIGITAL CONTENT RECOMMENDATION

BACKGROUND

Digital content delivery systems provide digital content, e.g., text, audio, images, videos, etc., in response to search queries or requests for content. To determine what digital content should be provided in response to a request, the digital content delivery system can maintain a list of keywords associated with the digital content. A negative keyword list is a list of keywords, which, if present in a request for digital content or user input associated with the request, indicates that digital content associated with the list of keywords should not be sent in response to the request. Negative keyword lists may span millions of keywords added over the course of years. Keywords in these lists become outdated over time, which causes some digital content to be excluded that would otherwise be appropriate or relevant to provide in response to a digital content request.

BRIEF SUMMARY

Aspects of the disclosure for keyword list filtering as part of identifying digital content responsive or relevant to a search query or request for content. A user, such as a content provider, may generate a keyword list associated with digital content of the content provider. Keyword lists, however, may be built over the course of years and can grow to include millions of keywords. Further, these keyword lists are often not maintained in line with changes in a content provider's digital content delivery strategy or context. An artificial intelligence (AI) model may be trained to generate a summary of the digital content associated with the content provider. That summary, along with the keyword list of the content provider, is provided as input into the AI model, which is trained to provide, as output, a recommendation to keep or remove a keyword from the keyword list.

Aspects of the disclosure also provide for an AI model training process for training a model to recommend keywords more accurately for removal from a keyword list. The training process integrates user feedback over the course of dozens or hundreds of keyword filtering recommendations generated by the model, to tune the model to later process thousands or millions of remaining keywords accurately and without user intervention. The feedback can clarify, or correct recommendations generated by the AI model, and/or natural language explanations that the AI model is also trained to generate. The explanations provide reasons or context as to why the AI model generated a particular recommendation to remove or keep a keyword.

DETAILED DESCRIPTION

Figure 1:
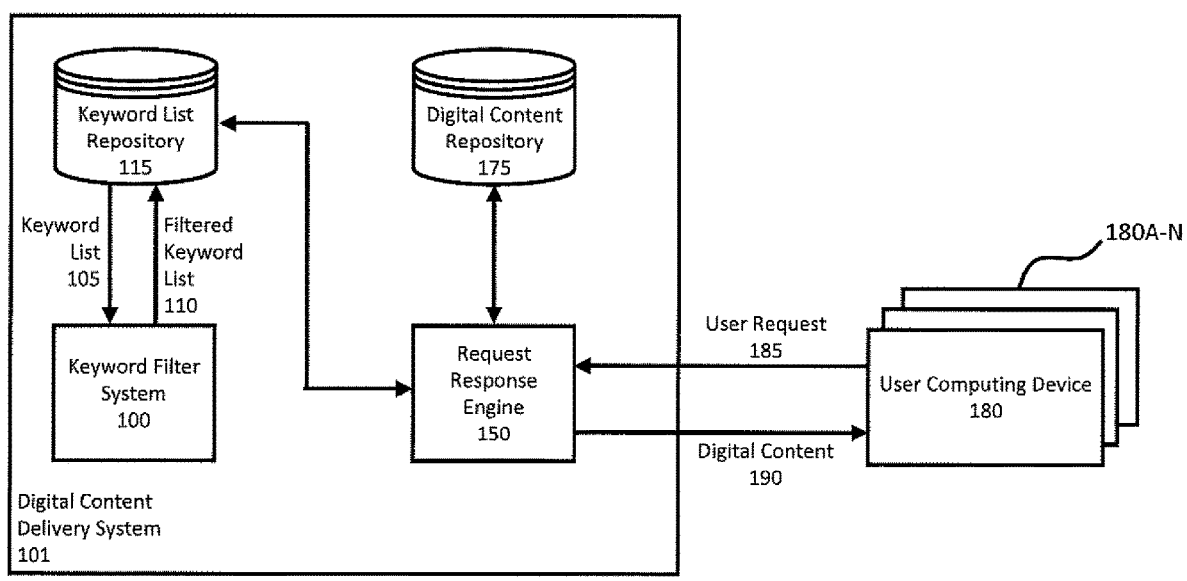
FIG. 1 is a block diagram of an example keyword filter system implemented as part of a digital content delivery system, according to aspects of the disclosure.

Aspects of the disclosure are generally directed to filtering a keyword list that is used to identify digital content responsive to a search query or request for content. A user, such as a content provider, may generate a keyword list associated with digital content. The keyword lists may be processed by one or more artificial intelligence ("AI") models that are trained to generate recommendations for keywords to remove from these keyword lists.

An AI model may be trained to generate a summary of the digital content associated with the content provider. The summary can be, for example, a series of statements or propositions related to the content provider, the digital content provided by the content provider, and/or the audience intended for the digital content provided by the content provider. The summary, along with the keyword list of the content provider, may be provided as input into the same or another AI model, which may be trained to provide, as output, a recommendation to keep or remove a keyword from the keyword list. The model can also output an explanation in natural language, explaining reasons for the recommendation to keep or remove a keyword from the keyword list.

Aspects of the disclosure also provide for a model training process for training a model to recommend keywords more accurately for removal from a keyword list. The training process integrates user feedback over the course of dozens or hundreds of keyword filtering recommendations generated by the model, to tune the model to later process thousands or millions of remaining keywords accurately and without user intervention.

Keyword lists may be built over the course of years and can grow to include millions of keywords. Further, these keyword lists are often not maintained in line with changes in a content provider's digital content or its digital content delivery strategy. Aspects of the disclosure can provide for at least the following technical advantages. Omitting keywords from the keyword list results in fewer keywords to process, while allowing for more accurate content delivery, overall. Having a keyword list with fewer keywords to process increases the computational efficiency of the system. Fewer keywords also can decrease the processing power and network overhead to communicate those keywords from a storage device to a processing device. A keyword list with fewer keywords requires less memory to store.

As a digital content delivery system may include digital content and keyword lists from hundreds or thousands of content providers, filtering keywords for even a subset of content providers can have significant effect on the efficiency of the content delivery system in parsing keyword lists and providing content in response to received queries and requests. Additionally, content can be provided in response to queries that would otherwise not have been provided because of one or more outdated keywords, improving content delivery accuracy. However, by filtering the keyword list, processing power and network overhead is decreased as providing replacement content for inaccurate and/or unwanted content would not be necessary, due to the filtered keyword list.

FIG. 1 is a block diagram of an example keyword filter system 100 implemented as part of a digital content delivery system 101, according to aspects of the disclosure. The digital content delivery system 101 can receive user requests for content 185 from a user computing device 180. The user computing device 180 can be one of multiple user computing devices, which may also include user computing devices 180A-N. The user request 185 can be, for example, a search query to a search engine implemented as part of the digital content delivery system 101, or other request for content. In some examples, input to the digital content delivery system automatically includes a request for content, for example for providing digital content that may be relevant in response to user activity, even if the input does not include an explicit content request.

The digital content delivery system 101 can receive the user request 185 for content at a request response engine 150. The engine 150 accesses a keyword list repository 115 and a digital content repository 175. The repositories 115 and 175 can be implemented, for example as one or more storage devices stored in one or more physical locations. In some examples, the repositories 115 and 175 form part of the same database or repository stored on the same storage devices.

The keyword list repository 115 stores various keyword lists associated with different providers of digital content. The keyword list can include negative keywords, which may be present in a search query or otherwise included as part of input on a computing device that is the recipient of digital content. A negative keyword is a keyword in which, if present in a search query or request for content, indicates that digital content associated with the list the negative keyword is a part of should not be provided in response to the query or request. The digital content delivery system 101 can be configured to determine that a query or user input includes one or more listed negative keywords, and not provide digital content associated with the keyword list to the recipient computing device.

In some examples, the keyword list can be a positive keyword list. A positive keyword is a keyword in which, if present in a search query or request for content, indicates that digital content associated with the list the positive keyword is a part of may be provided, or is more likely to be provided, in response to the query or request. The digital content delivery system 101 can be configured to determine that a query or user input includes one or more listed positive keywords, and provide digital content associated with the keyword list to the recipient computing device.

The request response engine 150 can determine, for a particular content provider, whether digital content associated with the content provider is to be provided in response to the user request 185. For example, if the user request 185 accompanies user input for a search query related to "sports," the engine 150 can determine that a keyword list for a given content provider includes the negative keyword "sports." In response to the user request 185, the engine 150 does not provide digital content from the digital content repository 175 associated with the keyword list of the given content provider, at least because the user request 185 contained a negative keyword. If the request response engine 150 determines that there is not a negative keyword in the user request 185, the engine 150 can provide digital content 190 that is responsive to the user request 185.

The engine 150 can provide the digital content 190 based on a variety of different heuristics, rules, rankings, or priorities. Digital content 190 can be, for example, text, images, videos, audio, and so on. The digital content 190 can correspond to content that is predicted to be responsive to the user request 185 or considered to be potentially of interest to a user making the request 185. The request response engine 150 can be configured to predict digital content responsiveness and/or digital content relevancy to the user, for example using one or more AI models trained to perform these predictions. Example digital content can include advertisements for products or services that are predicted to be relevant to the user making the request 185, and/or predicted to be responsive to the request 185 itself.

The keyword filter system 100 can receive a keyword list 105. The keyword list 105 can be stored on the keyword list repository 115 initially, or, in some examples, provided from another source, e.g., from a computing device associated with a content provider. The keyword filter system 100 is configured to generate a filtered keyword list 110. The keyword filter system 100 can receive multiple different keyword lists associated with the same or different content providers and filter the keywords according to aspects of the disclosure. Filtering a keyword list can refer to the system generating recommendations to keep or remove keywords from the keyword list 105. The keyword list 105 can be a negative keyword list or a positive keyword list, according to aspects of the disclosure. In some examples, the keyword list 105 may include both positive and negative keywords, indicated by some additional data, tag, field, etc.

The filtered keyword list 110 can include a subset of keywords that the keyword filter system 100 recommends keeping. The subset of keywords that the keyword filter system 100 recommends keeping may include fewer keywords than the initial keyword list 105. The filtered keyword list 110 can be stored in the repository 115 and accessed by the request response engine 150 for determining what digital content to provide in response to a request.

As an example, a keyword list may relate to digital content from a content provider relating to baseball. The keyword list may include terms from sports unrelated to baseball, e.g., negative keywords "basketball," "soccer," or "tennis." In some examples, the keyword list may include these unrelated terms to prevent digital content relating to baseball from being sent to computing devices in response to queries or input containing these keywords. However, over time, the digital content from the content provider may go from being more specific, e.g., limited to only baseball, to being about sports in general.

The shift in scope from a specific sport, e.g., baseball, to sports in general can be reflected in a summary generated by the keyword filter system 100. The summary can be, for example, a series of statements or propositions related to the content provider, the digital content provided by the content provider, and/or the nature of the intended audience for the digital content provided by the content provider. For example, the summary may include statements describing the category of digital content provided by the content provider. The category of digital content provided by the content provided may include, for example, informative content, entertainment, satirical content, advertisements, etc. The summary may also indicate the topics covered by the digital content. The topics of categories may include, for example, sports, news, products, services, technology, etc. The summary may also include statements related to the intended audience for the content provider. The intended audience may be, for examples, individuals, organizations, residents of a certain geographic region, consumers of content in a particular spoken or written language, etc. Techniques for generating the summary are described with reference to FIG. 2A-2B, herein.

In the "sports" example described above and herein, the keyword filter system 100 can receive an input keyword list and a summary, and provide recommendations to remove specific sports, e.g., "basketball," "soccer," or "tennis," from the keyword list. An example output can be a recommendation to remove the negative keyword "basketball" from the keyword list, with a provided explanation being that "basketball is a type of sport and therefore relevant to sports content in general."

The filtered keyword list 110 can require less storage space to store in the keyword list repository 115. Overall, the digital content delivery system 101 can perform more efficiently, as less data is required to transmit between the repository 115 and the request response engine 150. In some examples, if the request response engine 150 processes input keyword lists using a technique that executes in linear time, e.g., in time proportional to the length of the input keyword list, the engine 150 can process the filtered keyword list 110 in fewer processing cycles versus an unfiltered keyword list. The engine 150 using the filtered keyword list 110 to determine whether a negative keyword is in the user request 185 can also result in digital content not being omitted that would otherwise be responsive or relevant to the request.

Aspects of the disclosure can be implemented as a software application, e.g., a web application through a browser, a mobile application, a desktop application, etc., configured to manage keyword lists corresponding to different user accounts. The keyword filter system 100 described herein may be a feature of a computing platform, e.g., the digital content delivery system 101, that can be accessed through the application. In some examples, the keyword filter system 100 may be enabled for periodic keyword list filtering, e.g., on a quarterly basis or in response to the digital content delivery system 101 receiving input to add keywords to an existing list, or to add a new keyword list altogether. In some examples, the keyword filter system 100 may automatically perform the processes described herein, generating a recommended output list, which may be used to update existing keyword lists.

Figure 2A:
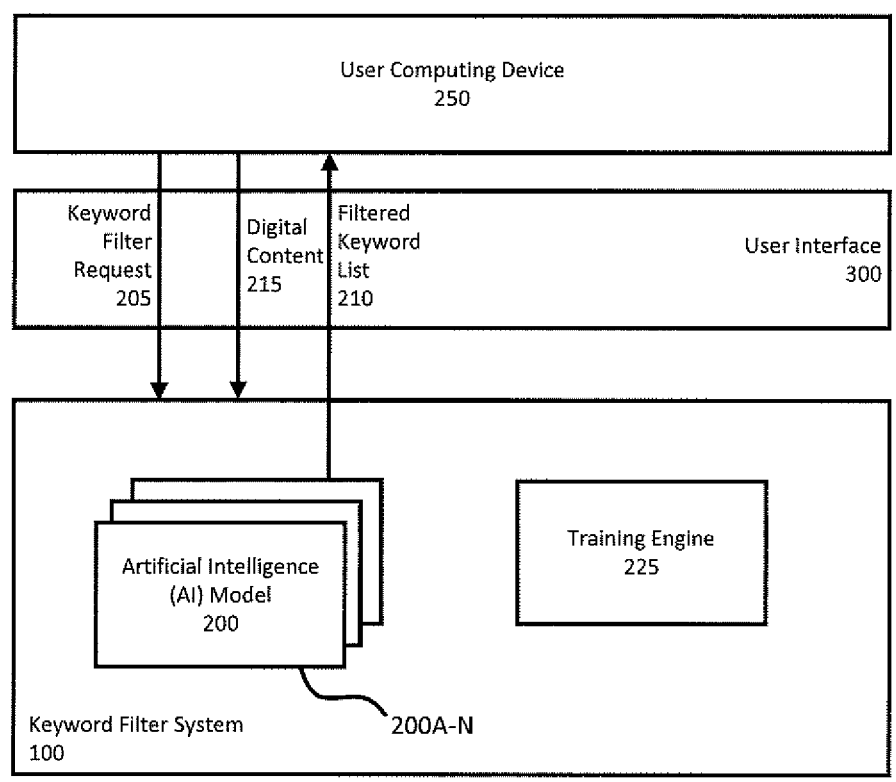
FIG. 2A is a block diagram of the example keyword filter system in a processing mode, according to aspects of the disclosure.

FIG. 2A is a block diagram of the example keyword filter system 100 in a processing mode, according to aspects of the disclosure. The keyword filter system 100 can receive a keyword filter request 205 from a user computing device 250. The user computing device can be associated with a content provider, for whom digital content is sent through the digital content delivery system 101. Input and output can be received and sent between the keyword filter system 100 and the computing device 250 through a user interface 300. The user interface 300 can include user interfaces 300A-300G, described herein and with reference to FIGS. 3A-3G. The user interface 300 can be, for example, an API, a web page, a standalone computer program, etc., which can be at least partially implemented in the user computing device 250 and/or on devices implementing the keyword filter system 100 or the content delivery system 101.

The keyword filter system 100, in response to the keyword filter request 205, can receive and process one or more negative keyword lists through artificial intelligence (AI) model 200. AI model 200 is one of multiple AI models that may be implemented, including AI models 200A-200N. In some examples, all the processing described herein with reference to an AI model is performed by the AI model 200. In some examples, processing described as being performed by an AI model is performed across multiple different AI models 200A-200N. In some examples, the AI model 200 may be a machine learning model, e.g., a large language model or large generative model.

The AI model 200 can receive, as input, keyword lists corresponding to the content provider associated with the keyword filter request 205. The received lists can be preloaded onto the keyword list repository 115 of the digital content delivery system 101 and selected from a larger selection of lists maintained by the repository 115 and associated with the content provider. The system can be configured in some examples to aggregate multiple input lists and generate a composite input list of unique keywords across the multiple lists. The keyword filter system 100 can receive multiple lists that may or may not overlap with one another, e.g., having the same or similar keywords.

The AI model 200 can receive a summary of the content provider, in addition to the input keyword lists for filtering. The AI model 200 may be trained to generate a summary of the digital content associated with the content provider. The summary can be in natural language, summarizing aspects of the digital content associated or provided by the content provider, digital content provided by the content provider, and/or the audience intended for the digital content. As part of generating the summary, the AI model 200 is configured to incorporate any additional context or information about the digital content from other sources, for example, based training on a larger corpus of data, which may include the digital content or information related to the digital content.

The AI model 200 can generate the summary from digital content 215 associated with the content provider. The digital content 215 may or may not include digital content intended for delivery in response to search queries or content requests. For example, the keyword filter system 100 can receive a homepage for a content provider's website or other web page or web content, or other videos, images, and/or text associated with the content provider and/or the digital content typically created or provided by the content provider. In some examples, the digital content 215 includes digital content intended for delivery in response to a digital content request at the digital content delivery system 101.

The AI model 200 can generate the summary from the digital content 215 according to any one of a variety of different natural language processing techniques for summarizing media, such as text. For example, the AI model 200 can be a deep neural network trained on training examples of text and summaries of the text. In some examples, the AI model 200 can implement a seq2seq framework or other type of encoder-decoder framework, to convert input text into an output summary. In some examples, if the AI model 200 is trained to receive input in modalities other than text, the AI model 200 can also be trained to convert non-text input into a text representation, e.g., transcribing audio, detecting text in input video or images, etc. The AI model 200, in some examples, can apply an attention mechanism as part of an encoder-decoder framework, to generate the summary.

In some examples, the digital content 215 received by the keyword filter system 100 can include information specific to digital content for a particular input list. For example, the digital content delivery system 101 may maintain multiple lists for a content provider, each list corresponding to a type of digital content provided by the user. Depending on the input lists, the system can receive information describing or characterizing the digital content associated with a list and provide that as part of the input to the model for generating a summary.

In some examples, the keyword filter system 100 may retrieve a pre-generated summary associated with a content provider. In some examples, the keyword filter system 100 may receive a summary as input, e.g., as part of the request 205, instead of generating the summary. The keyword filter system 100 can be configured to receive, e.g., through the user interface 300, user input for editing or revising the generated summary.

The keyword filter system 100 can process an input list of keywords and the summary through the AI model 200 trained to filter the keywords of the input list. For each keyword, the AI model 200 can generate a recommendation to remove or keep the keyword in the input keyword list. The AI model 200 can be trained to generate the recommendation as a type of classification task for the input keyword list and summary. The classification task can define two labels, e.g., "keep" and "remove."

The recommendation generated by the AI model 200 can be done based on, for example, relevance of the keyword to the input summary. One measure of relevance can include typological or lexical similarity, e.g., how similar are keywords to words used in the content provider summary. In some examples, a measure of relevance can be based on semantic similarity, e.g., how similar in meaning are the keywords to the words used in the user summary. For example, the AI model 200 is more likely to have the same recommendation for two keywords that are etymologically distinct but semantically similar. For example, in filtering a keyword list for a content provider that has shifted from providing digital content specifically for basketball, to content about sports in general, the AI model 200 can recommend both that the negative keyword "soccer" and the negative keyword "football" be removed from the filter list, as the terms can refer to the same game in different parts of the world. The AI model 200 can also identify similar keywords written in different languages.

The recommendation to keep or remove a given keyword can be based on a score generated by the AI model 200. Higher values of the score can correlate to a higher chance of recommendation to keep the keyword in an input list. Lower values of the score can correlate to a higher chance of recommendation to remove the negative keyword from the input list. In some examples, The AI model 200 can be trained to generate a score that is converted into an output classification, e.g., "keep" or "remove" the keyword. For example, if the score meets or exceeds a predetermined threshold, the AI model 200 can be trained to output a recommendation to keep the negative keyword. If the score meets or falls below another predetermined threshold, the AI model 200 can be trained to output a recommendation to remove the negative keyword from the input list.

The AI model 200 can also generate, along with a recommendation to keep or remove a keyword from a list, an explanation for the recommendation. The explanation can be expressed, for example, in natural language, as text, although the explanation in some examples may be generated in the form of audio, images, video, etc. The explanation can provide one or more statements for the recommendation, based on a measure of relevance used to train the AI model 200.

For example, the explanation can relate to the semantic similarity of the keyword with other keywords, or text in the content provider summary. If the content provider is summarized as "shifting from providing content related to basketball, to providing content about sports in general," then an explanation for the recommendation to remove "soccer" as a negative keyword can be "soccer is a type of sport, and the content provider provides sports content, generally."

As another example, an explanation can relate to other measures of relevancy, such as lexical relevance. In the sports content provider example, if the summary indicates that the content provider provides content related to "soccer," then the explanation as to why the AI model 200 recommends removing the negative keyword "football" can be "football and soccer can refer to the same sport."

As described herein, the AI model 200 can be trained according to a training process that integrates feedback data, which can be related to a recommendation generated by the AI model 200, an explanation generated by the AI model 200, or both. In some examples in which the AI model 200 integrates feedback data, the feedback data can form at least a partial basis for the explanation. In the sports content provider example, if the AI model 200 previously recommended keeping the negative keyword "chess" with the explanation that "chess is not a sport," the AI model 200 may later receive feedback data indicating that chess is considered a sport by the content provider. Thereafter, the AI model 200 may generate a recommendation to "keep" the negative keyword "chess," with the explanation that "chess is considered a sport."

A filtered keyword list 210 is an example of an output list generated by the AI model 200. The filtered keyword list 210 may only include keywords that remain after the system filters the keywords of the input list. In some examples, the AI model 200 may generate, as an output list, a change log or other data representing recommended changes to the input keyword lists processed as part of responding to the request 205. The keyword filter system 100 can receive the change log as input for making the changes to the input keyword list. The change log may be reviewed or modified, for example by the content provider, before the keyword filter system 100 receives the change log as input. In some examples, the filtered keyword list 210 can include all the negative keywords from the input list, with an added field storing the recommendation of the AI model 200.

In some examples, the filtered keyword list 210 can also include the explanation generated by the AI model 200 corresponding to the recommendation to keep or remove a given keyword, e.g., a negative or positive keyword. In some examples, the keyword filter system can also include as part of the output list any identifiers associated with the keyword, e.g., a name or other identifier from the input list or lists the keyword is a part of, and/or identifiers corresponding to the digital content that is not served in response to search queries including the keyword.

In some examples, the AI model 200 can be trained to recommend additional negative keywords to include in a keyword list. The added keywords may be suggested, for example, based on a predicted relevance the keyword may have to the content provider, digital content of the content provider, or the intended audience of the digital content. The AI model 200 can at least partially determine the relevance of a negative keyword to add to the keyword list, for example based on its relevance to text provided as part of the input summary for the content provider. As an example, if the summary indicates that the content provider is a sports content provider, but does not provide content related to "tennis," the AI model 200 can be trained to identify the context in which the term "tennis" is used in the summary, to propose that "tennis" also appear as a negative keyword.

In some examples, the AI model 200 can be trained to generate new positive keywords, based on an input positive keyword list and a summary of a content provider, and recommend the inclusion of those positive keywords in the keyword list. In some examples, different AI models are implemented for processing keyword lists with negative and positive keywords, separately. In some examples, the AI model 200 is trained to process both keyword lists with both negative and positive keywords, as described herein.

Filtering keyword lists using one or more AI models can increase computational efficiency. For example, by omitting keywords from a keyword list based on recommendations of the AI model 200, the subsequent scanning of the lists to determine digital content delivery is more computationally efficient. The reduced bandwidth, processing, and memory usage scale on a platform managing many keyword lists, each with potentially millions of keywords, across different content providers and various categories of digital content. Filtered keyword lists make identifying responsive digital content more accurate, and therefore, reduces the need to have to identify alternative content in response to a second request from a user after the original digital content provided was non-responsive. Preventing subsequent request for contents increases efficiency by reducing processing power consumption and network overhead.

Figure 2B:
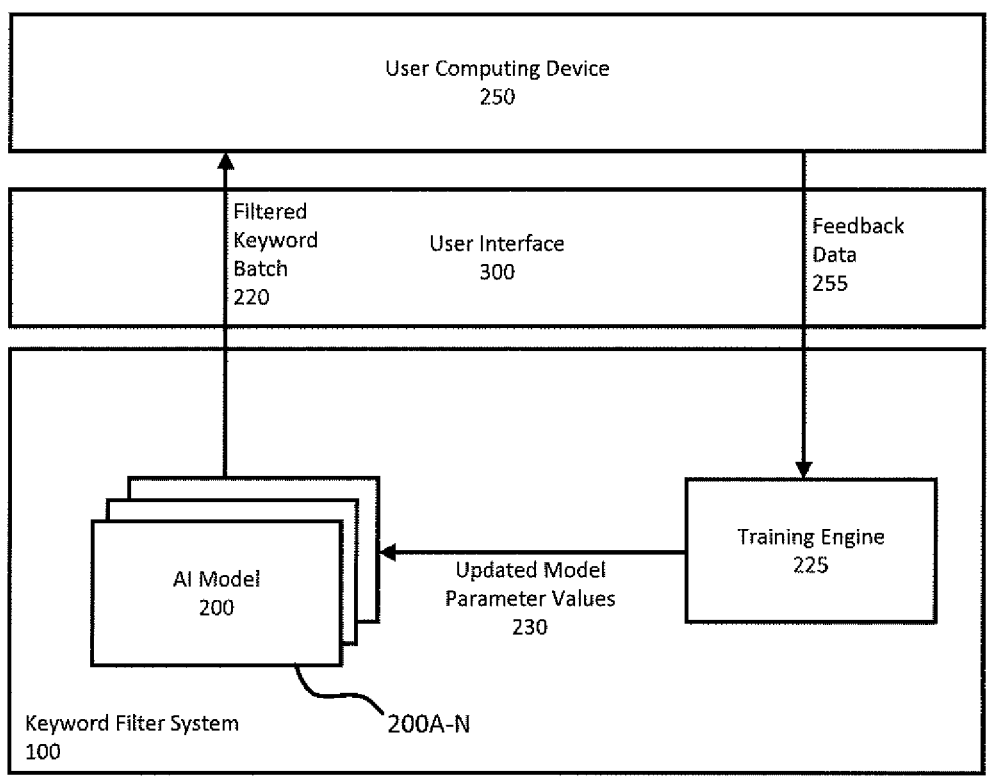
FIG. 2B is a block diagram of the example keyword filter system in a training mode, according to aspects of the disclosure.

FIG. 2B is a block diagram of the example keyword filter system 100 in a training mode, according to aspects of the disclosure. The keyword filter system 100 can include a training engine 225 configured for fine-tuning or at least partially re-training the AI model 200 in response to feedback data 255. Feedback data 255 is received through the user interface 300, for example in response to feedback or corrections to candidate recommendations and/or explanations generated by the AI model 200. Examples of candidate recommendations and/or explanations and of the feedback data 255 are provided in FIGS. 3A-3G and the corresponding description.

The AI model 200 may be pre-trained, for example on a corpus of text or other training data to perform any of a variety of different natural language processing tasks, such as text recognition, translation, text generation, etc. Training as described herein, e.g., with reference to FIG. 2B, can refer to either fine-tuning a pre-trained model, and/or retraining at least portions of the pre-trained model, e.g., by adding, removing, or modifying weight and/or bias parameter values.

During training, the keyword filter system 100 may receive or generate batches of keywords from input lists, e.g., from the user computing device 250 and/or the repository 115. The batches can be of various sizes, e.g., batches of 10-20 keywords per batch, although in some examples the AI model 200 is configured to process the negative keywords one at a time. For each keyword in the batch, the model outputs a recommendation to keep or remove the keyword from the keyword list. The AI model 200 also outputs an explanation for the recommendation.

At the end of processing the batch, the keyword filter system 100 can receive the model output, e.g., a recommendation and explanation, for each keyword in the batch, and provide the output to the user computing device 250 through the user interface 300. The user interface 300 is configured to receive feedback data 255 on the recommendations and/or explanations provided for the batch of keywords. The feedback data 255 can be, for example, a user rejection or acceptance of the recommendation for a given keyword. The feedback data 255 can also include revisions to the explanations provided by the AI model 200 for the recommendation to keep or remove a keyword from the list.

After receiving the feedback data 255, the training engine 225 can fine-tune or at least partially retrain the AI model 200 to incorporate any feedback from the previous batch and process a new batch of keywords. For example, the feedback data 255 can form a new or updated label for the input keyword, corresponding to a new or updated recommendation or explanation. The training engine 225 can compute a loss function between the updated label and the current recommendation and/or explanation and use the loss to update weight or bias parameter values of the AI model 200, e.g., using backpropagation and gradient descent with model parameter updates. The training engine 225 can implement any of a variety of different techniques for fine-tuning a large language model with supervised learning, in examples in which the AI model 200 is a large language model.

The keyword filter system 100 can receive the model output corresponding to another batch of keywords, and receive additional feedback data, if any. The keyword filter system 100 can also process the remaining keywords in the list using the AI model 200 updated with any feedback data provided during earlier training iterations. The AI model 200 can be updated with updated model parameter values 230, generated by the training engine 225.

Fine-tuning the AI model 200 as described herein allows for the AI model 200 to be efficiently adapted for accurate keyword list recommendations, on an individual content provider basis. For a digital content delivery system, which may manage different content providers with respective keyword lists and digital content, aspects of the disclosure provide for accurate keyword list recommendations. Dozens or hundreds of keywords may be processed in batches for training the AI model 200 to recommend thousands or tens of thousands of keywords automatically and accurately for filtering, overall.

FIGS. 3A-3G show examples of user interfaces that may be implemented as part of the user interface 300 for keyword list filtering, content summary generation, and/or keyword list filter training, as described herein. User interfaces described herein, including, for example user interfaces 300A-300G, can be implemented in any of a variety of different locations and according to any combination of hardware, firmware, and/or software. A user interface may be implemented at least partially on a user computing device, e.g., as a web page loaded on an internet browser, or as a computer program.

Input or output provided through a user interface can be provided directly to the keyword filter system 100. In some examples, input or output may be directed to a separate device or service configured for at least partially implementing the user interface, which then redirects traffic to the keyword filter system 100 to execute operations in response to the input. The keyword filter system 100 may provide output directly to a computing device at least partially implementing a user interface, or, in some examples, direct traffic first to the separate device or server.

An element of a user interface can provide information according to one or more modalities, e.g., text, audio, video, images, etc. An element may be interacted with, e.g., using a user input such as a mouse click, keyword input, touchscreen tap, etc., An element configured to receive input can be, for example, a button, a text field, a drop-down list, etc. The interface can receive input and a system, e.g., the keyword filter system 100, can be configured to perform one or more operations in response to the input. The keyword filter system 100 can generate output, which can be sent to a computing device through a user interface, for displaying or otherwise outputting data, e.g., as text, audio, images, video, etc. In FIGS. 3A-3G, text in quotation marks appearing in an element of a user interface is an example of text that may appear as part of the element or is an example of text that may be part of input to the element.

Figure 3A:
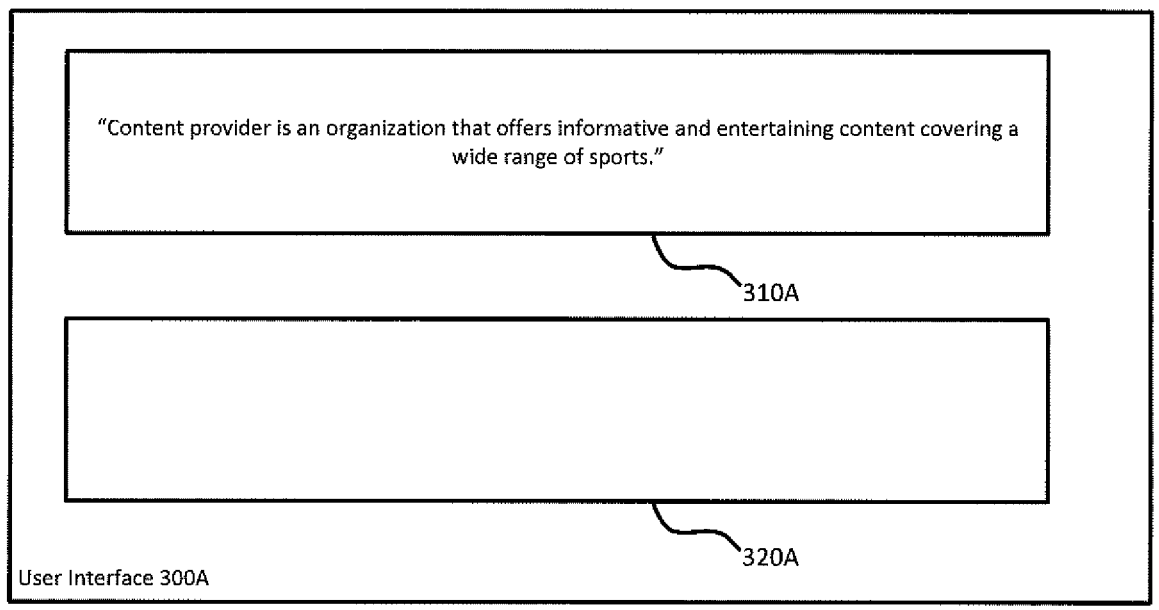
FIG. 3A is an example of a user interface for generating and receiving a summary of digital content, according to aspects of the disclosure.

FIG. 3A is an example of a user interface 300A for generating and receiving a summary of digital content, according to aspects of the disclosure. The user interface 300A can include a digital content summary element 310A and a summary feedback element 320A. The digital content summary element 310A can display or output a summary of digital content received from a content provider. In the user interface 300A, the element 310A displays, as an example, "Content provider is an organization that offers informative and entertaining content covering a wide range of sports." The summary feedback element 320A can be a user-interactable element for receiving feedback for the summary provided in the element 310A. In FIG. 3A, the summary feedback element 320A is blank.

Figure 3B:
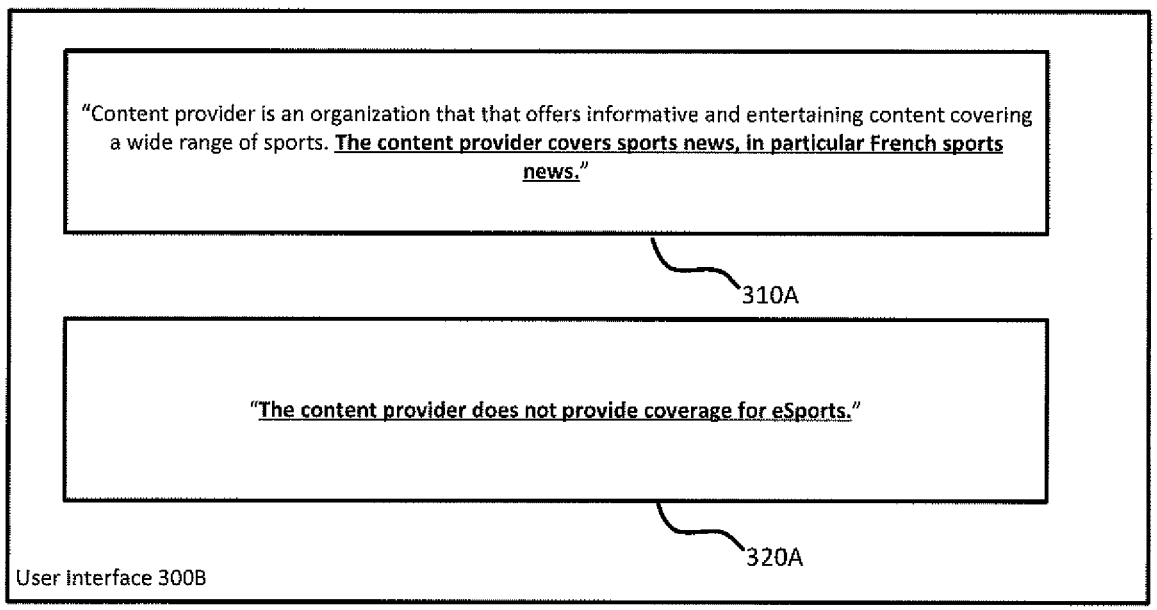
FIG. 3B is an example of a user interface for modifying the summary of a content provider.

FIG. 3B is an example of a user interface 300B for modifying the summary of digital content. The digital content summary element 310A can receive input for modifying the summary after being generated by the keyword filter system 100. In some examples, the keyword filter system 100 proceeds as described herein, without user input to modify the generated summary.

As shown in the user interface 300B, the summary in the digital content summary element 310A is modified to include an addition: "The content provider covers sports news, in particular French sports news." The addition provided to the summary modifies the summary to expand in scope or place particular emphasis on an aspect of the summary. In the example in FIG. 3B, the summary is expanded to include news, and places an emphasis on French sports news, in particular.

The summary feedback element 320A can receive feedback or modifications to the summary, for example, to limit the scope of the summary or to provide additional clarifications. In the example in FIG. 3B, the summary feedback element 320A receives the statement: "The content provider does not provide coverage for eSports." This statement can be integrated as feedback, such that the keyword filter system 100 receiving the summary as input for keyword filtering explicitly does not associate eSports, e.g., video games or virtual gaming, as an example of a sport indicated in the summary. One reason for the feedback can be to clarify or specifically limit the scope of how some terms in a summary are interpreted by the keyword filter system 100. Whereas a broader interpretation of the phrase a "wide range of sports" may suggest also including eSports, the feedback provided to the element 320A explicitly causes the keyword filter system 100 to not associate "eSports" with "sports."

Figure 3C:
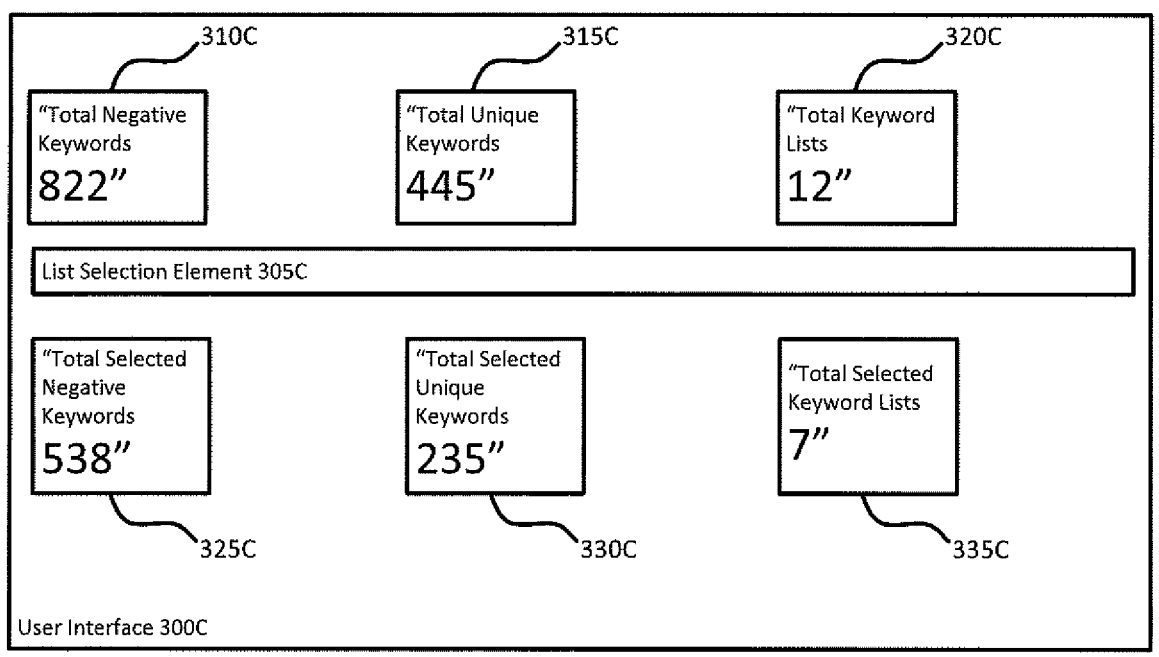
FIG. 3C is an example of a user interface for managing keyword lists.

FIG. 3C is an example of a user interface 300C for managing keyword lists. The user interface 300C includes a list selection element 305C for selecting one or more keyword lists for processing or training, and elements 310C-335C displaying or outputting various information related to the selected keyword lists.

Elements 310C, 315C, and 320C can provide information about all the keyword lists for a given content provider. Total negative keywords element 310C can display or output information related to the total number of negative keywords across all the keyword lists associated with the content provider. Element 310C shows, as an example, that there are 822 negative keywords in total. Total unique keywords element 315C can display or output information related to the total number of unique negative keywords across all the keyword lists. Because different keyword lists can overlap on multiple keywords, the element 315C can provide insight into the number of keywords that appear across the keyword lists, without counting multiple keywords multiple times. The element 315C shows, as an example, that there are 445 unique keywords across all the keyword lists. Total keyword lists element 320C can display or output information related to the total number of keyword lists associated with the content provider. The element 320C shows, as an example, that there are 12 keyword lists overall associated with the content provider.

The elements 325C, 330C, and 335C provide information similar to the elements 310C, 315C, and 320C, but only for the keyword lists selected to be input to the keyword filter system 100. For example, total selected keyword lists element 335C shows that seven keyword lists are selected. Of these seven keyword lists, total selected unique keywords element 330C shows that there are 235 unique keywords, and total selected negative keywords element 325C shows that there are 538 keywords overall.

Figure 3D:
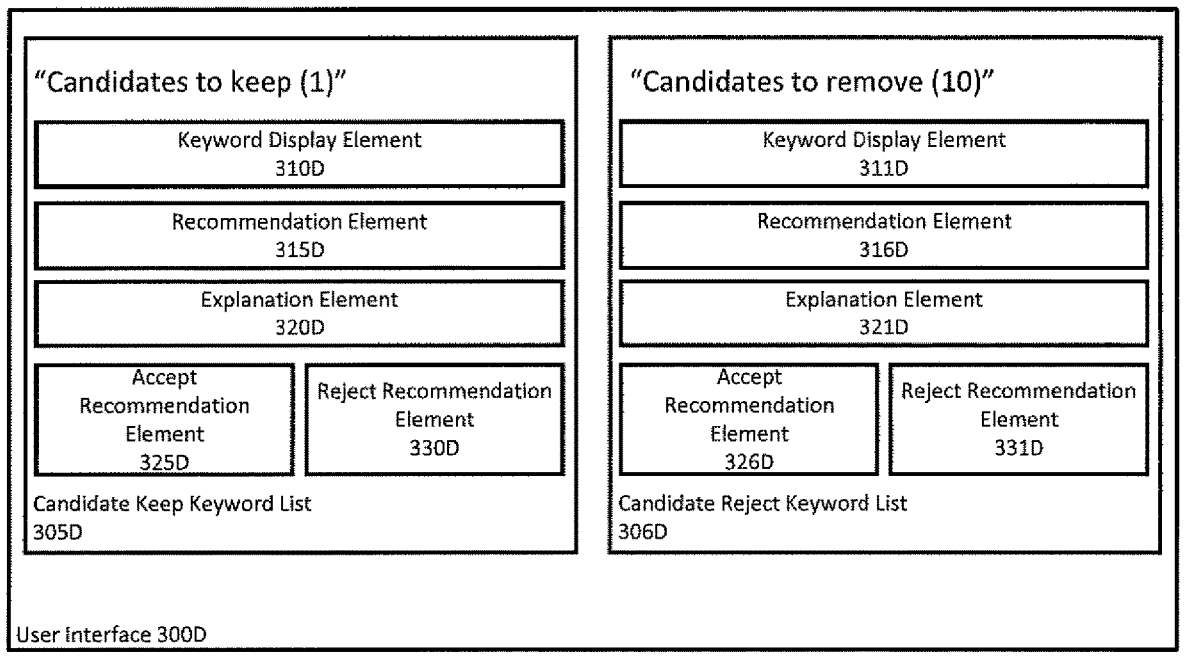
FIG. 3D is an example of a user interface for displaying recommendations and explanations generated by an AI model for keyword filtering, according to aspects of the disclosure.

FIG. 3D is an example of a user interface 300D for displaying recommendations and explanations generated by an AI model for keyword filtering, according to aspects of the disclosure. Keep list element 305D and remove list element 306D can display or output information related to candidate keywords that the AI model recommends keeping or removing from an input keyword list. A candidate keyword is a keyword that has an initial recommendation for keeping or removing but is generated as part of training, and still awaiting user confirmation or feedback. The keep list element 305D can display or output the number of remaining candidate keywords to keep, shown by the example text "Candidates to keep (1)" in FIG. 3D. The remove list element can display or output the number of remaining candidates to remove, shown by the example text "Candidates to remove (10)."

Keyword display element 310D and keyword display element 311D can display or output the next candidate keyword to review for keeping or removing, respectively. The recommendation element 315D and recommendation element 316D can display or output the recommendation for the keywords displayed or output from the elements 310D and 311D. Explanation element 320D and explanation element 321D can display or output the explanation corresponding to the recommendations displayed or output from the elements 315D and 316D.

Accept recommendation element 325D and accept recommendation element 326D are configured to accept user input for confirming that the recommendations and explanations for the keywords displayed in elements 310D and 311D are correct. Reject recommendation element 330D and rejection recommendation 331D are configured to receive input indicating that either one or both recommendations and explanations displayed, or output is incorrect. The keyword filter system 100 upon receiving input through reject recommendation elements 330D and 331D can advance to user interface 300F as described herein for receiving feedback data.

Figure 3E:
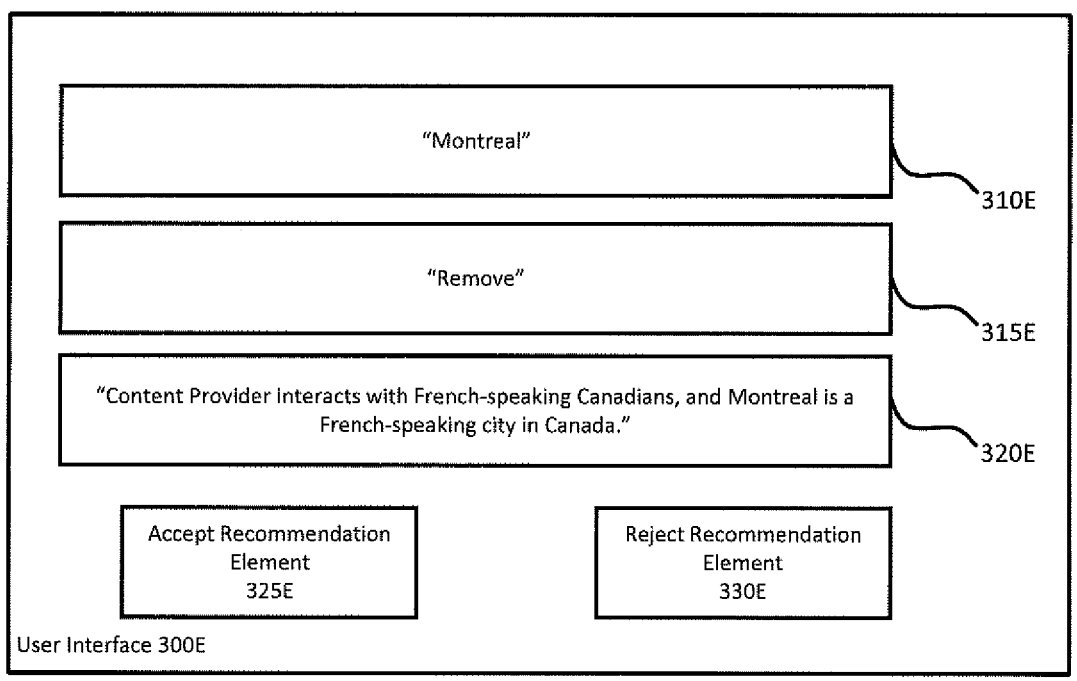
FIG. 3E is an example of a user interface displaying or outputting an example recommendation and explanation during training of an AI model for keyword filtering, according to aspects of the disclosure.

FIG. 3E is an example of a user interface 300E displaying or outputting an example recommendation and explanation during training of an AI model for keyword filtering, according to aspects of the disclosure. Keyword display element 310E displays the current keyword "Montreal." Recommendation display element 315E displays the current recommendation to remove the keyword from the keyword list. Explanation display element 320E displays the explanation corresponding to the recommendation to reject the keyword "Montreal": "Content Provider interacts with French-speaking Canadians, and Montreal is a French-speaking city in Canada."

In this example, the content provider may, at some point after the creation of its keyword list, choose to specifically focus on digital content requests from French speakers from France, instead of French-speaking people, generally. However, over time, the content provider's strategy or focus shifted to include French speakers in other parts of the world, such as Montreal. The keyword filter system is configured to identify this shift, for example from the summary generated for the example content provider.

In processing the keyword "Montreal," the keyword filter system is configured to recommend removing the keyword, at least because the summary indirectly or directly indicates that the content provider interacts with French speakers around the world. As a potential source for the explanation and recommendation to reject the negative keyword "Montreal," the keyword filter system can determine from the summary that digital content associated with the content provider is provided in French, a language that is highly associated with Montreal and other parts of the French-speaking world. The keyword filter system's recommendation can reduce the total keyword list size and prevent potentially relevant digital content from not being sent in response to requests that otherwise would not have received the digital content because of an outdated negative keyword.

Figure 3F:
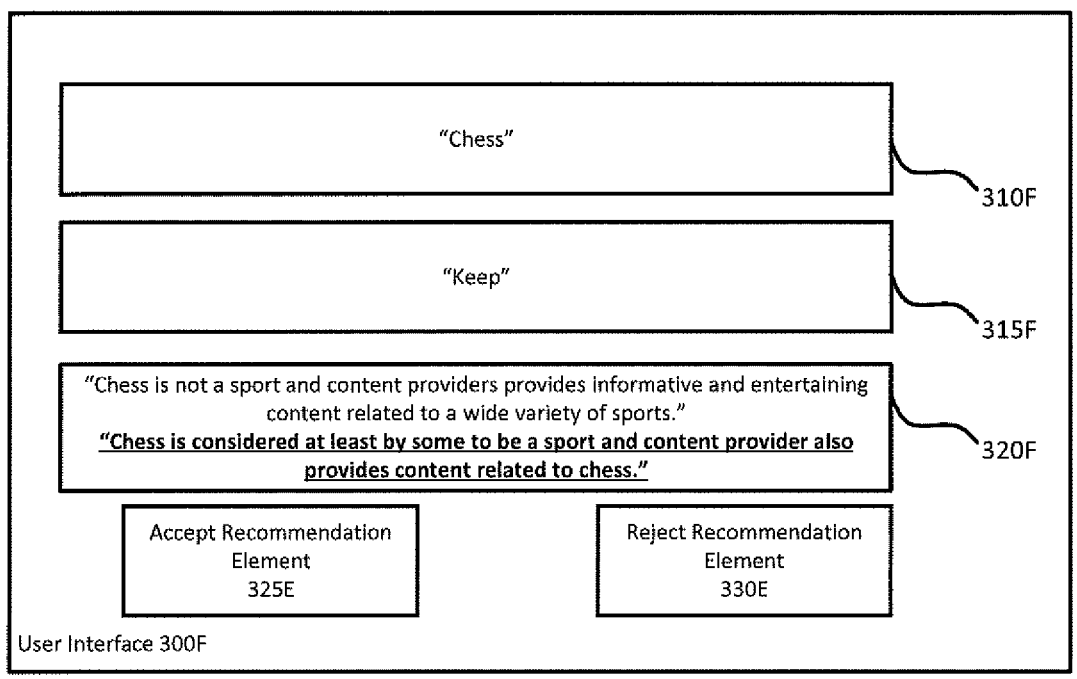
FIG. 3F is another example of a user interface for providing feedback during training of an AI model for keyword filtering, according to aspects of the disclosure.

FIG. 3F is another example of a user interface 300F for providing feedback during training of an AI model for keyword filtering, according to aspects of the disclosure. Keyword display element 310F displays negative keyword "Chess," recommendation display element 315F displays the recommendation from the AI model to "Keep" the negative keyword "Chess" in the keyword list. Explanation display element 320F initially provides an explanation for keeping the negative keyword as the text not in bold and underline: "Chess is not a sport and content providers provide informative and entertaining content related to a wide variety of sports." Referring to the example in FIG. 3A and the summary display element 310A, content provider may be "Content provider is an organization that offers informative and entertaining content covering a wide range of sports." Based on the summary, the keyword filter system 100 recommends keeping the negative keyword "Chess," with the explanation that chess is not a sport and therefore would not be covered by the content provider.

In this example, however, the content provider may also consider chess to be a sport, and therefore may reject the recommendation to keep "Chess" as a negative keyword on the keyword list. The user interface 300F is configured to receive feedback data, for example in the form of a clarification or correction in the recommendation display element 320F. In this example, the recommendation display element 320F receives the bolded and underlined feedback data shown in FIG. 3F: "Chess is considered at least by some to be a sport and content provider also provides content related to chess." The user interface 330F can receive input, for example from the reject recommendation element 330E, to cause the rejection of the recommendation and the modified explanation to be sent to the keyword filter system 100 as feedback data. The keyword filter system 100 can use the feedback data as described herein to fine-tune the AI model 200 for generating the keyword recommendations and use the updated AI model 200 for future recommendations.

Figure 3G:
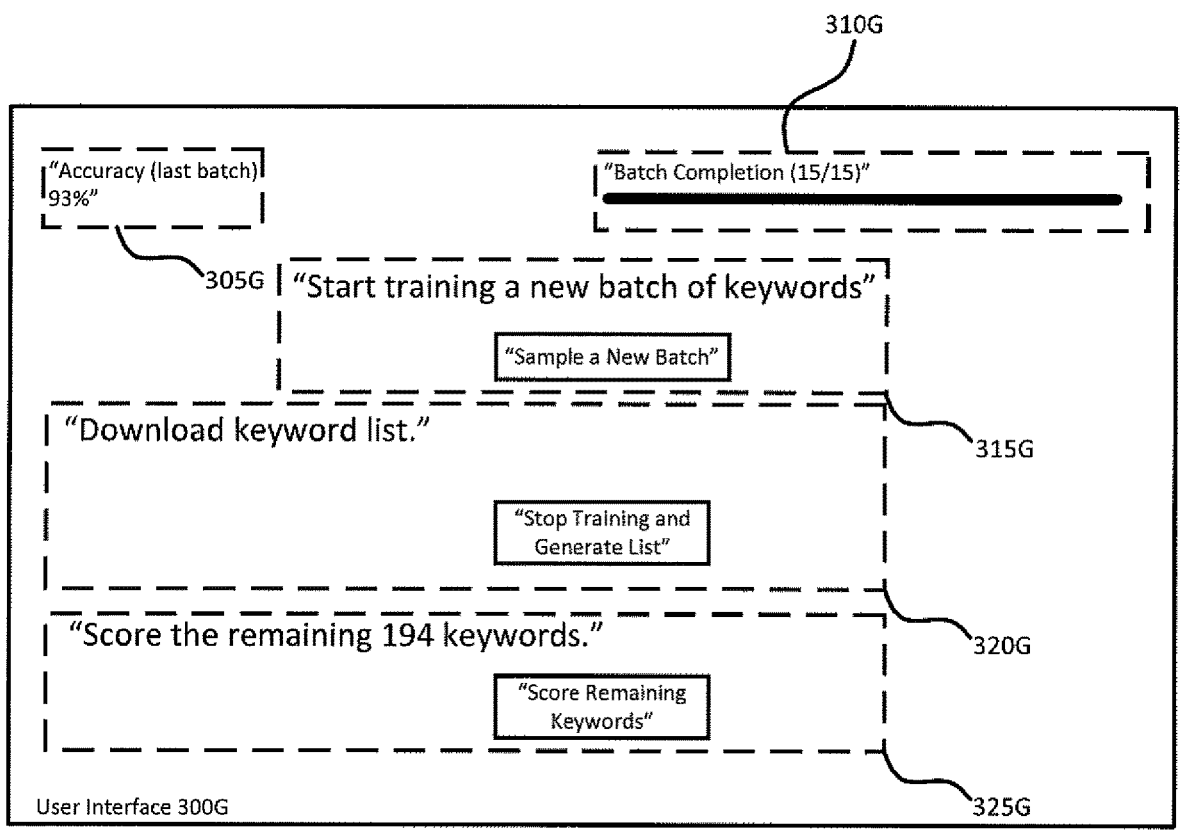
FIG. 3G is an example of a user interface after the system trains on a batch of keywords, according to aspects of the disclosure.

FIG. 3G is an example of a user interface 300G after the keyword filter system 100 trains on a batch of keywords, according to aspects of the disclosure. The user interface 300G can include an accuracy element 305G, indicating a percentage or some other metric for displaying or outputting the accuracy of the system during training. In the user interface 300G, the element 305G reports 93% accuracy from the last training batch of keywords. One measure of accuracy can be the number of recommendations and/or explanations that did not receive feedback over the total number of recommendations and/or explanations generated for the last training batch.

Batch completion element 310G can display or output the number of keywords in which a recommendation was generated, and feedback was requested. In the user interface 300G, the batch completion element 310G reports that fifteen out of fifteen keywords were processed as part of the last batch.

The user interface 300G can include a new batch iteration element 315G. The new batch iteration element 315G can include a user interactable element for sampling a new batch of keywords. The keyword filter system 100 is configured to receive input through the element 315G and begin another batch of training in response to the input.

The user interface 300G can include stop training and generate list element 320G. The element 320G can include a user interactable element for providing input to the keyword filter system 100, which when received, can cause the keyword filter system 100 to stop training and to generate an output list of keywords with recommendations and explanations that were generated up to the point in which input is received by the element 320G.

The user interface 300G can include a score of remaining keywords element 325G. The keyword filter system 100 is configured to receive input from the element 325G, and in response, generate recommendations and/or explanations for the remaining keywords in the input list. The keyword filter system 100 can output an output list of keywords as described herein.

In some examples, the keyword filter system 100 generates two separate output lists, a list for keywords recommended to remove from the input list, and a list of keywords from the input list that have been recommended by the machine learning model for keeping. The keyword filter system 100 can send an output list for user confirmation to update the current keyword lists corresponding to the user.

The keyword filter system 100 can automatically update the current keyword lists that were received as input to the AI model, with the output list. In some examples, the keyword filter system 100 automatically updates the current keyword lists with the output list, without additional user confirmation. In some examples, the keyword filter system 100 does not update the current keyword list with the output list, but instead provides the output list for download. The keyword filter system 100 is configured to later receive the output list as input for updating the current keyword list, for example after additional inspection of the output list by a user, or some other additional processing of the keyword list.

Figure 4A:
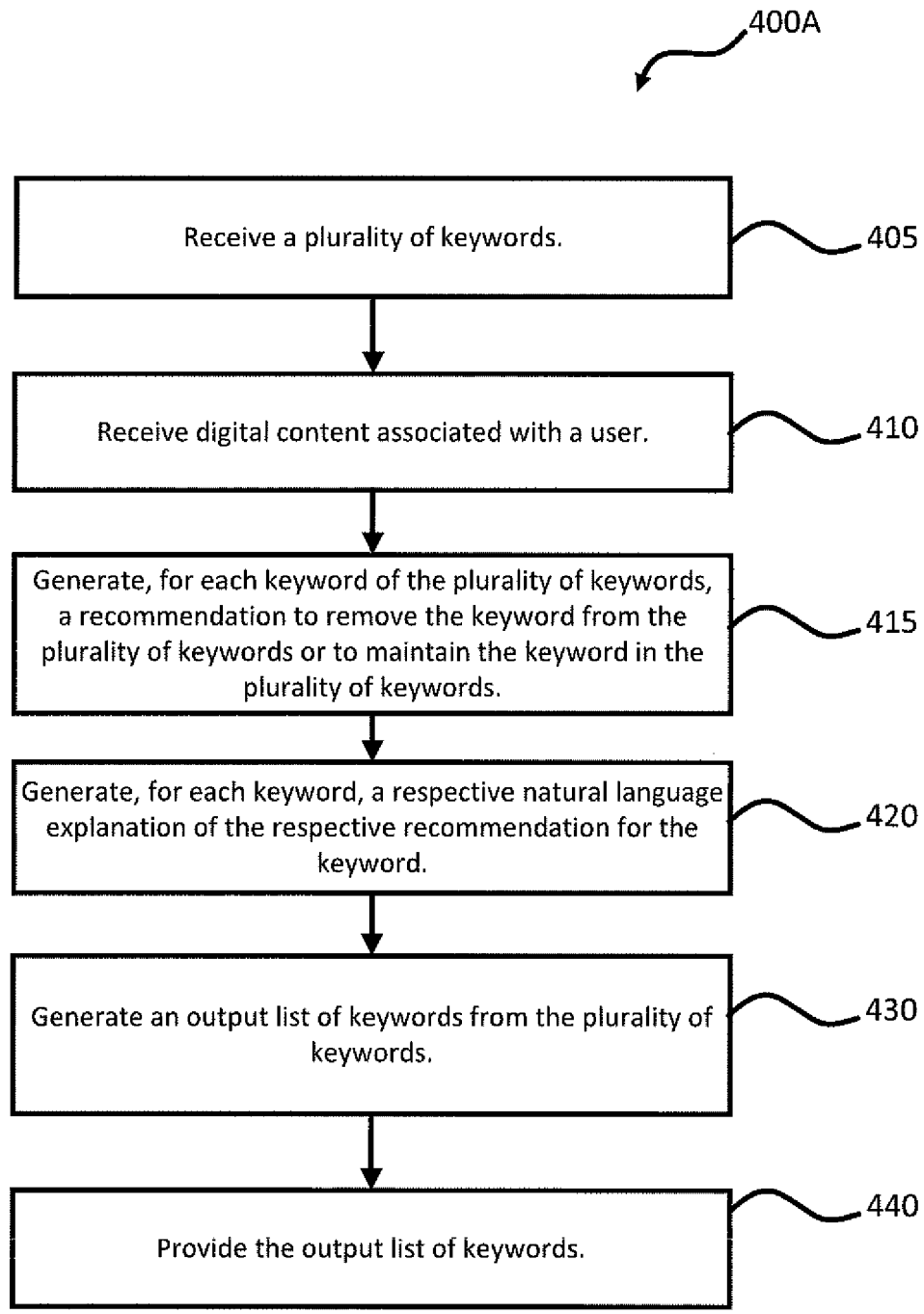
FIG. 4A is a flow diagram of filtering a keyword list using a trained AI model, according to aspects of the disclosure.

FIG. 4A is a flow diagram of an example process 400A for filtering a keyword list using a trained AI model, according to aspects of the disclosure. The example process 400A can be performed on a system of one or more processors in one or more locations, such as the keyword filter system 100 of FIG. 1.

The system receives a plurality of keywords, according to block 405. The keywords can be part of one or more lists of keywords from a content provider. The keywords can be negative keywords or positive keywords. The keywords can be received through one or more user interfaces, or, in some examples, received from a repository storing keyword lists.

The system receives digital content associated with a user, according to block 410. The user can be a content provider providing digital content associated with keywords received according to block 405. The digital content can include one or more one or more digital components, e.g., text, audio, video, etc., provided by the content provider or from another source, such as a website, mobile application, or the like. The website can be, for example, a web page authored by the content provider or otherwise associated with the content provider.

In some examples, the system generates a summary of the received digital content. In other examples, the system receives, as the digital content, a summary for providing as input to the one or more AI models of the keyword filter system. In some examples, the summary can be updated using feedback data, e.g., additions, deletions, and/or modifications of the generated summary. The feedback data can be provided by the content provider or another source.

The system generates, for each keyword of the plurality of keywords, a recommendation to remove the keyword from the plurality of keywords or to keep the keyword in the plurality of keywords, according to block 415. The recommendation to remove or keep the keyword can be generated, for example, as metadata or as part of a separate column or field associated with each keyword. The system uses one or more AI models trained as described herein to generate the recommendation.

The system generates, for each keyword, a respective natural language explanation of the respective recommendation for the keyword, according to block 420. The explanation can provide an explanation for the recommendation of the system to keep or remove the keyword.

In some examples, the system generates a recommendation without a respective explanation. In some use cases, generating a recommendation alone is sufficient, and therefore additional bandwidth to communicate the output generated by the system to a user computing device is not needed. In the aggregate, the keyword filter system can reduce data traffic for multiple content providers communicating with the system through multiple computing devices, improving overall operation of the system in use cases in which the content provider does not require an explanation for the recommendations by the system. In some examples, the system is configured to generate explanations in response to a separate request for explanations for keyword recommendations, allowing the explanations to still be accessed on an ad hoc or as-requested basis.

The system generates an output list of keywords from the plurality of keywords, according to block 430.

The system provides the output list of keywords, according to block 440. The output list can be provided in response to a request for digital content, for example a request received to a digital content delivery system. The digital content delivery system can determine, using the output list and the input including a digital content request, whether digital content associated with the output list should be provided in response to the request. If the digital content delivery system determines that digital content associated with the output list should be provided in response to the request, the system can proceed to transmit the digital content.

Figure 4B:
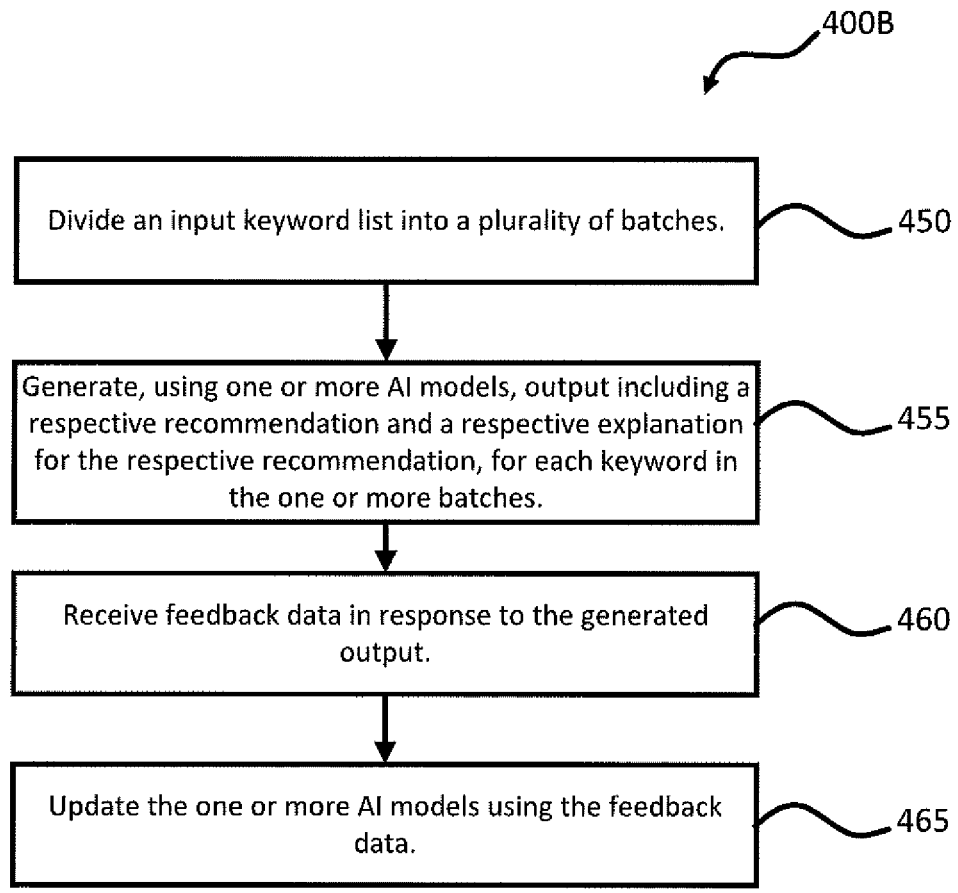
FIG. 4B is a flow diagram of an example process for training an AI model to filter a keyword list, according to aspects of the disclosure.

FIG. 4B is a flow diagram of an example process for training an AI model to filter a keyword list, according to aspects of the disclosure. The example process can be performed on a system of one or more processors in one or more locations, such as the keyword filter system 100 of FIG. 1.

The system divides an input keyword list of a plurality of keywords into a plurality of batches, according to block 450. Each batch can include, for example, ten to twenty keywords, although in some examples a batch can include a single keyword or include more than twenty keywords. The system can perform one or more iterations of the operations according to blocks 455-465.

For a batch of keywords, the system generates, using one or more AI models, output including a respective recommendation and a respective explanation for each keyword in the one or more batches, according to block 455. The one or more AI models receives the batch of keywords, as well as a summary for the content provider associated with the keywords. The one or more AI models can include a model trained to generate the summary from digital content, as described herein. The one or more AI models can include a single model trained to generate a summary, as well as to generate a recommendation and explanation to keep or remove a keyword from the batch of keywords received. The one or more AI models can include a large generative model, such as a large language model (LLM). The one or more AI models can already be trained on a larger corpus of training data, and then further trained or fine-tuned according to the process 400B, described herein.

The system receives feedback data in response to the generated output, according to block 460. The system can provide, through a user interface, the output recommendations, and explanations for each keyword in a received batch. The feedback data can be received by the system through the user interface.

The system updates the one or more AI models using the feedback data, according to block 465. The system can update weight values, bias values, and/or other parameter values representing the one or more AI models, to reflect changes to the models in response to the feedback data. For example, the one or more AI models can be updated using a supervised fine-tuning process, in which the feedback data is used by a training engine performing the fine-tuning to provide updated labels corresponding to the keywords of the received batch. The updated labels can include a ground-truth recommendation and/or explanation of the recommendation, provided as part of the feedback data.

After one or more iterations of training batches of keywords, the system can receive input, e.g., through the user interface, to stop training and process the remaining keywords. The remaining keywords are processed through the one or more AI models, which have been fine-tuned according to the iterations of training batches of keywords. The system can generate output recommendations and explanations for keywords, which were not part of the original training batches. This process of training the one or more AI models allows the system to generate more accurate recommendations, based on specific context or content delivery strategies informed by feedback data provided by the content provider or another reviewer. The keyword filter system trained according to aspects of the disclosure overall provides more accurate keyword lists, resulting in less wasted bandwidth caused by erroneous digital content delivery. The output lists also may contain far fewer keywords than the original input lists, which allows for more efficient storage of the keyword lists using less memory or data storage, overall.

Implementations of the present technology include, but are not limited to, the following:

(1) A method, when performed by one or more processors, causes the one or more processors to perform operations including: receiving, by one or more processors, a plurality of keywords; receiving, by the one or more processors, digital content associated with a user; executing, by the one or more processors, an artificial intelligence (AI) model, wherein executing the AI model comprises: generating, for each keyword of the plurality of keywords, a recommendation to remove the keyword from the plurality of keywords or to keep the keyword in the plurality of keywords, wherein the recommendation is based on the digital content associated with the user, and generating an output list of keywords from the plurality of keywords, wherein each keyword with a respective recommendation to remove the keyword is omitted from the list; and providing as output, by the one or more processors, the output list of keywords.

(2) The method of (1), wherein receiving the digital content associated with the user includes: receiving one or more digital components associated with the user; and generating, as the digital content, a summary of the one or more digital components associated with the user.

(3) The method of (1) or (2), further including updating the summary of the one or more digital components in accordance with feedback data received through a user interface.

(4) The method of any one of (1) through (3), wherein the one or more digital components includes a web page associated with the user.

(5) The method of any one of (1) through (4), further including training the AI model, the training including: dividing the plurality of keywords into a plurality of batches; and for one or more batches in the plurality of batches: generating output comprising a respective recommendation and a respective natural language explanation for the respective recommendation for each keyword in the one or more batches, receiving feedback data in response to the generated output, and updating the AI model using the feedback data.

(6) The method of (5), wherein the method further includes, after updating the AI model using the feedback data, generating output comprising a respective recommendation and a respective explanation for each keyword of a batch of the plurality of batches that is not of the one or more batches.

(7) The method of (5) or (6), wherein the AI model is a machine learning model or a large language model.

(8) The method of any one of (1) through (7), further including: receiving, by the one or more processors, input from a computing device, the input comprising natural language and associated with a request for digital content; determining, by the one or more processors and based on the output list of keywords, whether the input comprises one or more keywords in the output list of keywords; and in response to determining that the input does not comprise one or more keywords in the output list of keywords, providing digital content in response to the request.

(9) The method of (8), wherein the input is a search query comprising a request for digital content.

(10) A system including memory and one or more processors, the one or more processors configured to perform a method as in any one of (1) through (9).

(11) One or more non-transitory computer-readable storage media storing instructions that are operable, when executed by one or more processors, to cause the one or more processors to perform operations including the method of any one of (1) through (9).

In some implementations, the techniques disclosed herein enable artificial intelligence to perform digital content summarization and keyword list filtering. Artificial intelligence (AI) is a segment of computer science that focuses on the creation of models that can perform tasks with little to no human intervention. Artificial intelligence systems can utilize, for example, machine learning, natural language processing, and computer vision. Machine learning, and its subsets, such as deep learning, focus on developing models that can infer outputs from data. The outputs can include, for example, predictions and/or classifications. Natural language processing focuses on analyzing and generating human language. Computer vision focuses on analyzing and interpreting images and videos. Artificial intelligence systems can include generative models that generate new content, such as images, videos, text, audio, and/or other content, in response to input prompts and/or based on other information.

Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some machine-learned models can include multi-headed self-attention models (e.g., transformer models).

The model(s) can be trained using various training or learning techniques. The training can implement supervised learning, unsupervised learning, reinforcement learning, etc. The training can use techniques such as, for example, backwards propagation of errors. For example, a loss function can be backpropagated through the model(s) to update one or more parameters, e.g., weights or biases, of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations. A number of generalization techniques (e.g., weight decays, dropouts) can be used to improve the generalization capability of the models being trained.

For example, training data can include multiple training examples that can be received as input by the machine learning models. The training examples can be labeled with a desired output for the model when processing the labeled training examples. The training examples can be labeled with noisy labels that guarantee label differential privacy.

The noisy labels and the model output can be evaluated through a loss function to determine an error, which can be back propagated through the machine learning model to update weights for the model.

The model(s) can be pre-trained before domain-specific alignment. For instance, a model can be pre-trained over a general corpus of training data and fine-tuned on a corpus of training data, e.g., training data including feedback data from a user interface as described herein. A model can be aligned using prompts that are designed to elicit domain-specific outputs, e.g., for keyword filtering according to aspects of the disclosure. Prompts can be designed to include learned prompt values (e.g., soft prompts). The trained model(s) may be validated prior to their use using input data other than the training data and may be further updated or refined during their use based on additional feedback/inputs.

Figure 5:
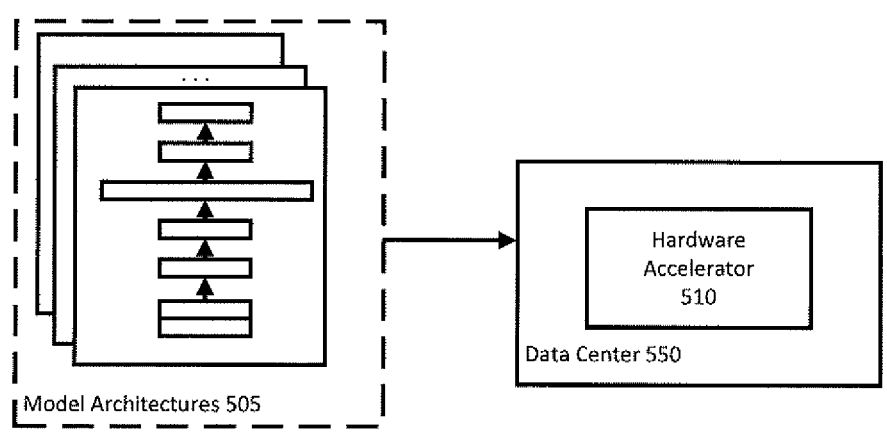
FIG. 5 is a block diagram illustrating one or more model architectures, such as for deployment in a data center housing a hardware accelerator on which the deployed models will execute for keyword list filtering, according to aspects of the disclosure.

FIG. 5 is a block diagram illustrating one or more model architectures 505, such as for deployment in a data center 550 housing a hardware accelerator 510 on which the deployed models will execute for keyword list filtering, according to aspects of the disclosure. The hardware accelerator 510 can be any type of processor, such as a CPU, GPU, FPGA, or ASIC such as a Tensor Processing Unit (TPU). Although only one hardware accelerator 510 is shown as part of the data center 550, it is understood that multiple hardware accelerators can be implemented across different physical locations, including across different data centers, including the data center 550.

An architecture of a model can refer to characteristics defining the model, such as characteristics of layers for the model, how the layers process input, or how the layers interact with one another. For example, the model can be a convolutional neural network that includes a convolution layer that receives input data, followed by a pooling layer, followed by a fully connected layer that generates a result. The architecture of the model can also define types of operations performed within each layer. For example, the architecture of a convolutional neural network may define that rectified linear unit (ReLU) activation functions are used in the fully connected layer of the network. One or more model architectures can be generated that can output results associated with summary generation and keyword list filtering.

Figure 6:
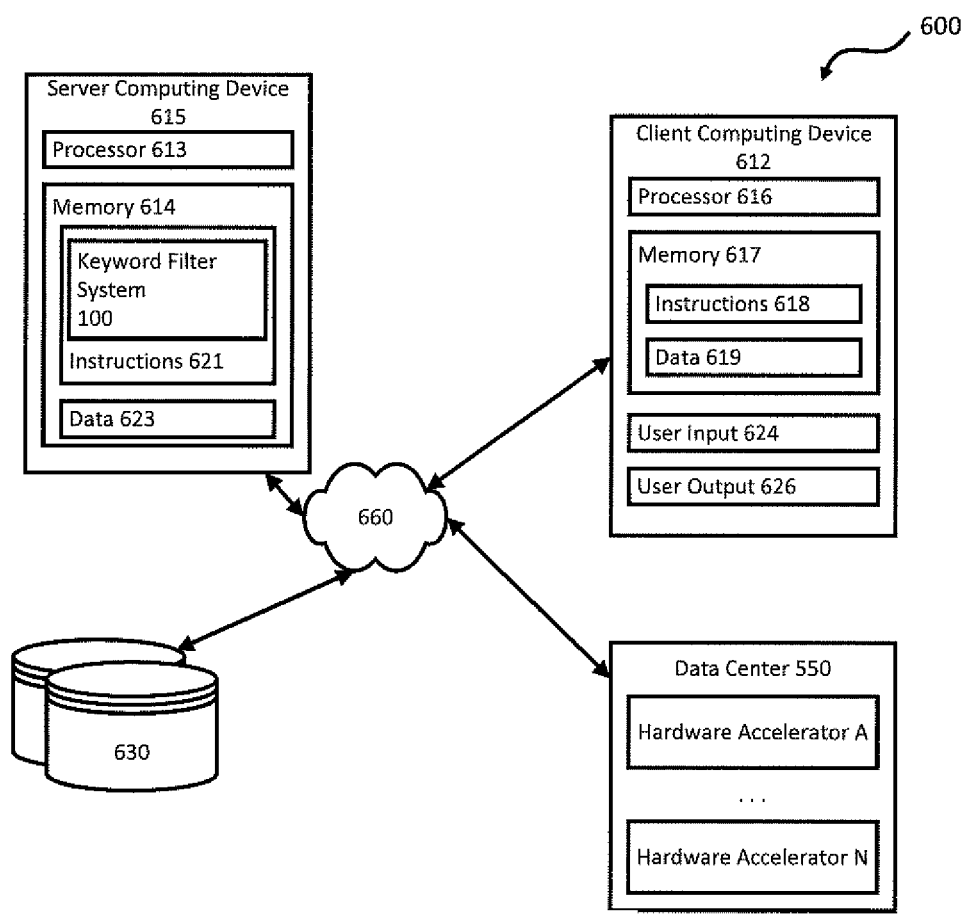
FIG. 6 is a block diagram of an example computing environment for implementing the keyword filter system.

FIG. 6 is a block diagram of an example computing environment 600 for implementing the keyword filter system 100. The keyword filter system 100 can be implemented on one or more devices having one or more processors in one or more locations, such as in server computing device 615. User computing device 612 and the server computing device 615 can be communicatively coupled to one or more storage devices 630 over a network 660. The storage device(s) 630 can be a combination of volatile and non-volatile memory and can be at the same or different physical locations than the computing devices 612, 615. For example, the storage device(s) 630 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 615 can include one or more processors 613 and memory 614. The memory 614 can store information accessible by the processor(s) 613, including instructions 621 that can be executed by the processor(s) 613. The memory 614 can also include data 623 that can be retrieved, manipulated, or stored by the processor(s) 613. The memory 614 can be a type of non-transitory computer readable medium capable of storing information accessible by the processor(s) 613, such as volatile and non-volatile memory. The processor(s) 613 can include one or more central processing units (CPUs), graphic processing units (GPUs), field-programmable gate arrays (FPGAs), and/or application-specific integrated circuits (ASICs), such as tensor processing units (TPUs).

The instructions 621 can include one or more instructions that when executed by the processor(s) 613, causes the one or more processors to perform actions defined by the instructions. The instructions 621 can be stored in object code format for direct processing by the processor(s) 613, or in other formats including interpretable scripts or collections of independent source code modules that are interpreted on demand or compiled in advance. The instructions 621 can include instructions for implementing the keyword filter system 100 consistent with aspects of this disclosure. The keyword filter system 100 can be executed using the processor(s) 613, and/or using other processors remotely located from the server computing device 615.

The data 623 can be retrieved, stored, or modified by the processor(s) 613 in accordance with the instructions 621. The data 623 can be stored in computer registers, in a relational or non-relational database as a table having a plurality of different fields and records, or as JSON, YAML, proto, or XML documents. The data 623 can also be formatted in a computer-readable format such as, but not limited to, binary values, ASCII, or Unicode. Moreover, the data 623 can include information sufficient to identify relevant information, such as numbers, descriptive text, proprietary codes, pointers, references to data stored in other memories, including other network locations, or information that is used by a function to calculate relevant data.

The user computing device 612 can also be configured similar to the server computing device 615, with one or more processors 616, memory 617, instructions 618, and data 619. The user computing device 612 can also include a user output 626, and a user input 624. The user input 624 can include any appropriate mechanism or technique for receiving input from a user, such as keyboard, mouse, mechanical actuators, soft actuators, touchscreens, microphones, and sensors.

The server computing device 615 can be configured to transmit data to the user computing device 612, and the user computing device 612 can be configured to display at least a portion of the received data on a display implemented as part of the user output 626. The user output 626 can also be used for displaying an interface between the user computing device 612 and the server computing device 615. The user output 626 can alternatively or additionally include one or more speakers, transducers or other audio outputs, a haptic interface or other tactile feedback that provides non-visual and non-audible information to the platform user of the user computing device 612.

Although FIG. 6 illustrates the processors 613, 616 and the memories 614, 617 as being within the computing devices 615, 612, components described in this specification, including the processors 613, 616 and the memories 614, 617 can include multiple processors and memories that can operate in different physical locations and not within the same computing device. For example, some of the instructions 621, 618 and the data 623, 619 can be stored on a removable SD card and others within a read-only computer chip. Some or all of the instructions and data can be stored in a location physically remote from, yet still accessible by, the processors 613, 616. Similarly, the processors 613, 616 can include a collection of processors that can perform concurrent and/or sequential operation. The computing devices 615, 612 can each include one or more internal clocks providing timing information, which can be used for time measurement for operations and programs run by the computing devices 615, 612.

The server computing device 615 can be configured to receive requests to process data from the user computing device 612. For example, the environment 600 can be part of a computing platform configured to provide a variety of services to users, through various user interfaces and/or APIs exposing the platform services. One or more services can be a machine learning framework or a set of tools for generating neural networks or other machine learning models according to a specified task and training data. The user computing device 612 may receive and transmit data specifying requests for digital content, search queries, or other data.

The devices 612, 615 can be capable of direct and indirect communication over the network 660. The devices 615, 612 can set up listening sockets that may accept an initiating connection for sending and receiving information. The network 660 itself can include various configurations and protocols including the Internet, World Wide Web, intranets, virtual private networks, wide area networks, local networks, and private networks using communication protocols proprietary to one or more companies. The network 660 can support a variety of short- and long-range connections. The short- and long-range connections may be made over different bandwidths, such as 2.402 GHz to 2.480 GHz (commonly associated with the Bluetooth® standard), 2.4 GHz and 5 GHZ (commonly associated with the Wi-Fi® communication protocol); or with a variety of communication standards, such as the LTE® standard for wireless broadband communication. The network 660, in addition or alternatively, can also support wired connections between the devices 612, 615, including over various types of Ethernet connection.

The computing environment 600 can also include a data center 550, including hardware accelerators A-N, for training or executing the AI models of the keyword filter system 100. Although a single server computing device 615, user computing device 612, and data center 550 are shown in FIG. 6, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Aspects of this disclosure can be implemented in digital electronic circuitry, in tangibly-embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on one or more tangible non-transitory computer storage media for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, that is generated to encode information for transmission to suitable receiver apparatus for execution by a data processing apparatus.

The term "configured" is used herein in connection with systems and computer program components. For a system of one or more computers to be configured to perform particular operations or actions means that the system has installed software, firmware, hardware, or a combination thereof that cause the system to perform the operations or actions. For one or more computer programs to be configured to perform operations or actions means that the one or more programs include instructions that, when executed by one or more data processing apparatus, cause the apparatus to perform the operations or actions.

The term "data processing apparatus" refers to data processing hardware and encompasses various apparatus, devices, and machines for processing data, including programmable processors, a computer, or combinations thereof. The data processing apparatus can include special purpose logic circuitry, such as a field programmable gate array (FPGA) or an application specific integrated circuit (ASIC), such as a Tensor Processing Unit (TPU). The data processing apparatus can include code that creates an execution environment for computer programs, such as code that constitutes processor firmware, a protocol stack, a database management system, an operating system, or combinations thereof.

The data processing apparatus can include special-purpose hardware accelerator units for implementing machine learning models to process common and compute-intensive parts of machine learning training or production, such as inference or workloads. Machine learning models can be implemented and deployed using one or more machine learning frameworks, such as static or dynamic computational graph frameworks.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a standalone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" refers to a software-based system, subsystem, or process that is programmed to perform one or more specific functions. The engine can be implemented as one or more software modules or components or can be installed on one or more computers in one or more locations. A particular engine can have one or more computers dedicated thereto, or multiple engines can be installed and running on the same computer or computers.

The processes and logic flows described herein can be performed by one or more computers executing one or more computer programs to perform functions by operating on input data and generating output data. The processes and logic flows can also be performed by special purpose logic circuitry, or by a combination of special purpose logic circuitry and one or more computers.

A computer or special purpose logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a personal digital assistant (PDA), a mobile audio or video player, a game console, a Global Positioning System (GPS), or a portable storage device, e.g., a universal serial bus (USB) flash drive, as examples.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back-end component, e.g., as a data server, a middleware component, e.g., an application server, or a front-end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
receiving, by one or more processors, from a user, a plurality of keywords associated with digital content of the user, the plurality of keywords being used to identify the digital content responsive to a search query or request for content;
generating, by the one or more processors, a text summary of one or more digital components of the digital content associated with the user;
executing, by the one or more processors, an artificial intelligence (AI) model stored in a storage device, wherein the executing the AI model comprises:
receiving, as input, the plurality of keywords and the text summary of the one or more digital components;
in response to the receiving the input, generating, based on a score generated by the AI model, for each keyword of the plurality of keywords, a recommendation to remove a keyword from the plurality of keywords when the score falls below a predetermined threshold or to keep the keyword in the plurality of keywords when the score exceeds another predetermined threshold, wherein the recommendation is based on the text summary of the one or more digital components; and
generating an output list of keywords from the plurality of keywords, wherein each keyword of the plurality of keywords with a respective recommendation to remove the keyword is omitted from the output list;
providing as output to a device, by the one or more processors, the generated output list of keywords that includes the recommendations;
receiving, by the one or more processors, feedback data in response to the generated output list of keywords; and
updating, in accordance with the feedback data, the plurality of keywords associated with the digital content of the user with the output list of keywords.

2. The method of claim 1, wherein the method further comprises updating the text summary of the one or more digital components in accordance with feedback data received through a user interface.

3. The method of claim 1, wherein the one or more digital components comprises a web page associated with the user.

4. The method of claim 1, further comprising training the AI model, the training comprising:
dividing the plurality of keywords into a plurality of batches; and for one or more batches in the plurality of batches:
generating output comprising a respective recommendation and a respective natural language explanation for the respective recommendation for each keyword in the one or more batches,
receiving feedback data in response to the generated output, and updating the AI model using the feedback data.

5. The method of claim 4, wherein the method further comprises, after updating the AI model using the feedback data, generating output comprising a respective recommendation and a respective explanation for each keyword of a batch of the plurality of batches that is not of the one or more batches.

6. The method of claim 4, wherein the AI model is a machine learning model or a large language model.

7. The method of claim 1, wherein the output list of keywords includes positive keywords and negative keywords.

8. The method of claim 7, further comprising:
receiving, by the one or more processors, input from a computing device, the input comprising natural language;
determining, by the one or more processors, whether the input comprises one or more positive keywords or one or more negative keywords in the output list of keywords; and
providing at least one digital component of the digital components when the input comprises at least one positive keyword of the positive keywords and none of the negative keywords in the output list of keywords.

9. The method of claim 8, wherein the input is a search query.

10. A system, comprising:
a memory; and
one or more processors configured to:
receive, from a user, a plurality of keywords associated with digital content of the user, the plurality of keywords being used to identify the digital content responsive to a search query or request for content;
generate a text summary of one or more digital components of the digital content associated with the user;
execute an artificial intelligence (AI) model stored in a storage device, wherein to execute the AI model, the one or more processors are configured to:
receive, as input, the plurality of keywords and the text summary of the one or more digital components;
in response to the receiving the input, generate, based on a score generated by the AI model, for each keyword of the plurality of keywords, a recommendation to remove a keyword from the plurality of keywords when the score falls below a predetermined threshold or to keep the keyword in the plurality of keywords when the score exceeds another predetermined threshold, wherein the recommendation is based on the text summary of the one or more digital components;
generate an output list of keywords from the plurality of keywords, wherein each keyword of the plurality of keywords with a respective recommendation to remove the keyword is omitted from the output list; and
provide as output to a device, the generated output list of keywords that includes the recommendations;
receive feedback data in response to the generated output list of keywords; and
update, in accordance with the feedback data, the plurality of keywords associated with the digital content of the user with the output list of keywords.

11. The system of claim 10, wherein the one or more processors are further configured to update the text summary of the one or more digital components in accordance with feedback data received through a user interface.

12. The system of claim 10, wherein the one or more digital components comprises a web page associated with the user.

13. The system of claim 10, wherein the one or more processors are further configured to train the AI model, wherein in training the AI model, the one or more processors are configured to:
divide the plurality of keywords into a plurality of batches; and
for one or more batches in the plurality of batches:
generate output comprising a respective recommendation and a respective natural language explanation for the respective recommendation, for each keyword in the one or more batches,
receive feedback data in response to the generated output, and
update the AI model using the feedback data.

14. The system of claim 13, wherein after updating the AI model using the feedback data, the one or more processors are configured to generate output comprising a respective recommendation and a respective explanation for each keyword of a batch of the plurality of batches that is not a batch of the one or more batches.

15. The system of claim 13, wherein the AI model is a machine learning model or a large language model.

16. The system of claim 10, wherein the output list of keywords includes positive keywords and negative keywords.

17. The system of claim 16, wherein the one or more processors are further configured to:
receive input from a computing device, the input comprising natural language; determine whether the input comprises one or more positive keywords or one or more negative keywords in the output list of keywords; and
provide at least one digital component of the digital components when the input comprises at least one positive keyword of the positive keywords and none of the negative keywords in the output list of keywords.

18. The system of claim 17, wherein the input is a search query.

19. One or more non-transitory computer-readable storage media, storing instructions that are operable, when executed by one or more processors, to cause the one or more processors to perform operations comprising:
receiving, by the one or more processors, from a user, a plurality of keywords associated with digital content of the user, the plurality of keywords being used to identify the digital content responsive to a search query or request for content;
generating, by the one or more processors, a text summary of one or more digital components of the digital content associated with the user;
executing, by the one or more processors, an artificial intelligence (AI) model stored in a storage device, wherein the executing the AI model comprises:
receiving, as input, the plurality of keywords and the text summary of the one or more digital components;
in response to the receiving the input, generating, based on a score generated by the AI model, for each keyword of the plurality of keywords, a recommendation to remove a keyword from the plurality of keywords when the score falls below a predetermined threshold or to keep the keyword in the plurality of keywords when the score exceeds another predetermined threshold, wherein the recommendation is based on the text summary of the one or more digital components;
generating an output list of keywords from the plurality of keywords, wherein each keyword of the plurality of keywords with a respective recommendation to remove the keyword is omitted from the output list; and
providing as output to a device, by the one or more processors, the generated output list of keywords that includes the recommendations;
receiving, by the one or more processors, feedback data in response to the generated output list of keywords; and
updating, in accordance with the feedback data, the plurality of keywords associated with the digital content of the user with the output list of keywords.

20. The computer-readable storage media of claim 19, further comprising training the AI model, the training comprising:
- dividing the plurality of keywords into a plurality of batches; and
- for one or more batches in the plurality of batches:
- generating output comprising a respective recommendation and a respective natural language explanation for the respective recommendation, for each keyword in the one or more batches,
- receiving feedback data in response to the generated output, and
- updating the AI model using the feedback data.

* * * * *